UNITED STATES PATENT OFFICE.

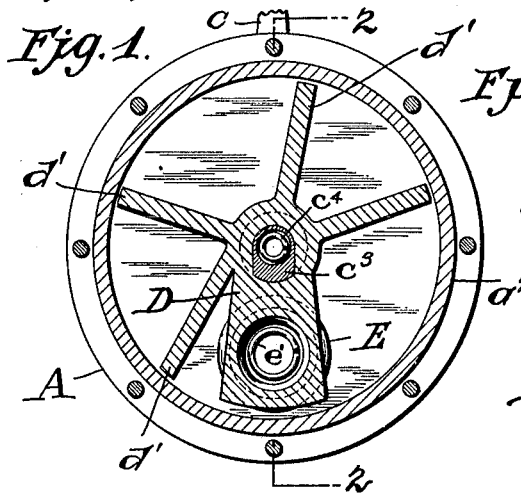
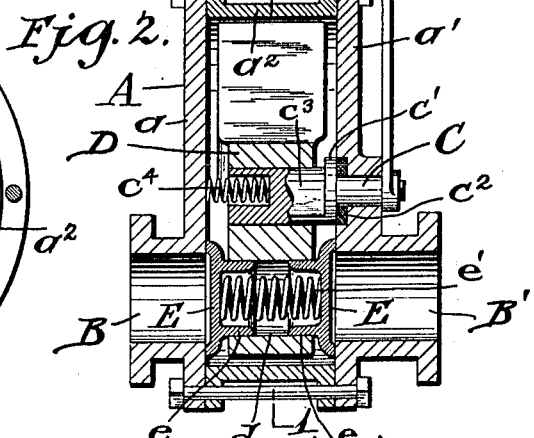
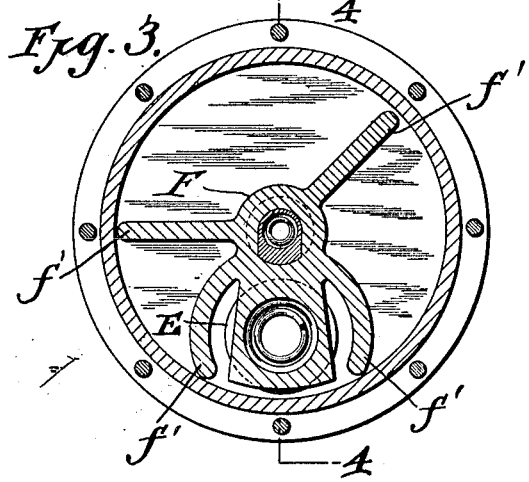
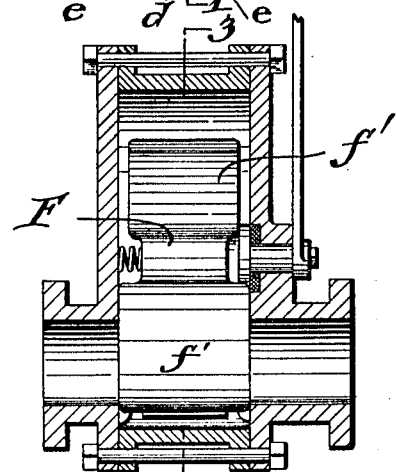
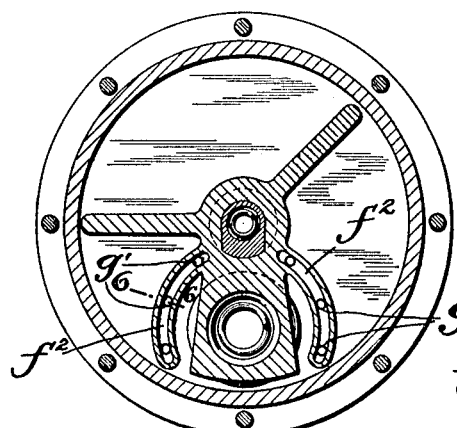
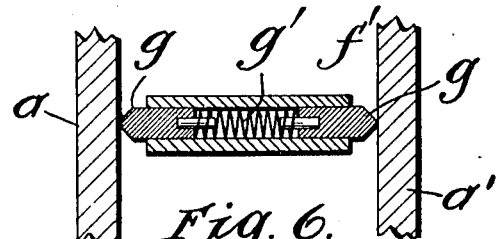

WYLIE GEMMEL WILSON, OF NEW YORK, N. Y., ASSIGNOR, BY MESNE ASSIGNMENTS, TO EVERLASTING VALVE COMPANY, A CORPORATION OF NEW JERSEY.

NON-CLOGGING VALVE.

1,314,559. Specification of Letters Patent. Patented Sept. 2, 1919.

Application filed March 30, 1917. Serial No. 158,628.

*To all whom it may concern:*

Be it known that I, WYLIE GEMMEL WILSON, a subject of the King of Great Britain, and a resident of New York city, in the county of New York and State of New York, have invented certain new and useful Improvements in Non-Clogging Valves, of which the following is a specification.

This invention is a non-clogging valve and relates, more particularly, to improvements in valves of the general type exemplified by the well known "everlasting valve."

In valves of the type specified, the passage of fluid through the valve casing is controlled by port-sealing disks which are mounted for bodily oscillation into and out of alinement with the ports constituting the inlet and outlet of the valve casing. In valves of this type, *i. e.*, valves wherein the port sealing elements, and the means positioned within the valve casing for actuating said elements, do not completely fill the interior of said casing, sediment from the fluid passing through the valve frequently becomes deposited within the valve casing, causing the clogging of the valve and rendering the operation of opening and closing the same difficult. This is particularly true where considerable foreign matter is in suspension in the fluid passing through the valve, which suspended particles, in different environments, may be iron borings, paper pulp, dirt, or such other foreign material as to not only clog the valve, but, also get between the valve seats and the coöperating sealing disks, and injure the contiguous surfaces thereof through wear and the gouging action of such hard, solid particles.

Moreover, with valves of the type wherein the sealing element or elements are mounted on an operating head, adapted to be oscillated to seal and unseal the valve ports, considerable difficulty is found in controlling the flow of a fluid carrying a relatively high percentage of impurities in suspension. This is due to the fact that the operating head is in the form of an arm mounted for oscillation in a valve chamber of considerably greater dimensions, whereby much excess space is left for the accumulation of sediment deposited by the fluid passing through the valve. As the operating head is generally mounted for oscillation eccentrically within the valve chamber, it will be manifest that, when the said head is oscillated, it compacts the accumulated sediment and the same becomes tightly wedged or jammed between the operating arm and the relatively eccentric wall of the valve chamber, thereby rendering the operation of said valve difficult, if not impossible. Such a condition may also result even though the operating head is mounted coaxially of the valve chamber. When such a condition exists, it becomes necessary to dismantle the valve, usually by disconnecting the valve from the conduit in which it is included and removing one of the face-plates of said valve, for the purpose of cleaning out the sediment.

This practice, besides being laborious, is often extremely costly since the valves are, in many cases, so situated, that it is necessary to shut down a boiler or completely drain a system, before the valve can be removed and cleaned, with the result that all work must be suspended during the cleansing operation.

With the foregoing disadvantages in mind, the object of the present invention is to provide means, associated with the operating head, which will preclude the wedging or jamming of accumulated sediment within the valve chamber in such manner as to render the operation of the valve impossible, and to so form the valve that the cleaning operation may be accomplished automatically and without necessitating the dismantling of the valve.

In one of its practical forms the invention embodies the mounting of the operating head coaxially of the circular valve chamber, whereby said operating head is adapted for complete rotation, and associated with the operating head are a plurality of fins, which serve as partitions, to divide the valve chamber into a plurality of smaller chambers. The sediment does not so readily accumulate in these separated chambers and even though it does accumulate it is much more readily moved by the various fins, when the operating head is shifted, than could be the case if that portion of the operating head which carries the sealing disks was called upon, of itself only, to move the entire body of such sediment.

Features of the invention, other than those specified, as well as the advantages thereof, will be apparent from the hereinafter detailed description taken in conjunction with the accompanying drawings.

In the accompanying drawings I have illustrated different practical embodiments of the invention, but the constructions therein shown are to be understood as illustrative, only, and not as defining the limits of the invention.

Figure 1 is a transverse section through a valve embodying the present invention, said section being taken in the plane of the line 1—1 of Fig. 2.

Fig. 2 is a central, longitudinal section through the valve of Fig. 1, said section being taken substantially in the plane of the line 2—2 of Fig. 1.

Figs. 3 and 4 are sections corresponding to the showing of Figs. 1 and 2, but taken through a valve embodying a modified form of construction.

Fig. 5 is a section corresponding to that of Fig. 3, but illustrating a further modified construction, and Fig. 6 is a fragmental section, taken in the plane of the line 6—6 of Fig. 5.

Referring to the drawings, and, more particularly, to Figs. 1 and 2 thereof, wherein the preferred form of the invention is illustrated, A designates the valve casing, preferably embodying two opposite face-plates $a$ $a'$, spaced apart by a ring $a^2$, which parts are bolted together to form a casing, as best shown in Fig. 2. Formed off-center of face-plates $a$ and $a'$, and in alinement with one aonther, are the inlet port B, in face-plate $a$, and the outlet port B', in face-plate $a'$. A casing constructed as described has an interior valve chamber in the form of a hollow cylinder.

Positioned coaxially with the valve chamber and journaled in one of the face-plates is the valve post C, the outer end of which is preferably squared to receive a wrench $c$, or any other suitable form of operating means. The portion of the valve post which extends through the face-plate in which it is journaled is cylindrical in shape, to allow of its rotation, and has formed thereon, immediately interior of said face-plate, a collar $c'$, which rests against any suitable form of packing $c^2$, positioned in a recess in the inner surface of said face-plate. The portion $c^3$ of post C, which extends into the valve chamber, is squared, of irregular contour, or cam-shaped, as shown, and is recessed at its free end to provide a pocket in which a spring $c^4$ is retained. Through the pressure of spring $c^4$, the collar $c'$ is pressed tightly against the packing $c^2$ and leakage through the bearing is precluded.

Positioned within the valve chamber and mounted upon the cam-shaped post portion $c^3$ for rotation coaxially with post C, is the operating head D. The post portion $c^3$ extends through a passage in head D which is shaped complementarily to the cross-section of the post, so as to lock the parts together, whereby the manipulation of the handle $c$ causes oscillation of head D. Extending through head D, in parallel relation to the axis of rotation thereof, is a passage or pocket $d$, positioned at such distance from said axis of rotation that the head may be manipulated into a position to bring pocket $d$ into alinement with the inlet and outlet ports B B'. Extending into pocket $d$, from the opposite ends thereof, are the shanks $e$ of the two valve disks E. A spring $e'$ is interposed between the two valve disks to maintain the ground faces thereof in tight engagement with the inner faces of the face-plates $a$ $a'$, so that, when said valve disks are brought into juxtaposition with the inlet and outlet ports, said ports will be imperviously sealed. It will be apparent, from what has been said, that the handle $c$ may be operated to oscillate head D in such manner as to move valve disks E out of alinement with the ports, to allow of the free flow of fluid through the valve, and to return the head to the initial position wherein the valve disks seal said ports.

A valve of the character described operates with great efficiency, and this is particularly the case where the fluid, the flow of which the valve controls, is comparatively pure. However, where a relatively impure fluid is controlled, i. e., a fluid carrying in suspension a large percentage of foreign particles or material, some of this material is apt to become deposited within the valve chamber in the form of sediment, which can only be removed through the releasing of one of the face-plates from the bolts which maintain the valve casing assembled, and then scraping out such sediment as has been deposited within said chamber. This is because of the fact that when considerable sediment has become deposited within the valve chamber the oscillation of the head D causes said sediment to become compacted. At each successive operation of the valve this compacting becomes tighter, so that finally a hard mass of sediment is jammed or wedged within the casing between the faces of the operating head and the walls of the casing. If it is endeavored to rotate the head under such circumstances, it will be found practically impossible, as the head would be called upon to move the entire mass of sediment about a center, through the application of force at substantially one point.

To obviate the occurrence of this condition and thereby render the dismantling of the valve unnecessary, this invention contemplates the formation of the head in such manner that it is provided with means whereby, upon the actuation of the head, the force applied through the wrench $c$, is transmitted to the accumulated sediment at a plurality of points about the axis of oscillation of the operating head. This means is preferably in the form of a plurality of fins or arms $d'$ which are mounted on the operating head, or formed integral therewith, so that they are moved or shifted with every operation of said head. The fins $d'$ preferably, though not essentially, extend in substantially a radial direction from the axis of the head and, in effect, serve as partitions for dividing the valve chamber into a plurality of smaller chambers or compartments. They may be of any number or shape desired but their edges preferably extend into intimate relation with the inner walls of the valve chamber. Moreover, the particular placement may be varied, but in Fig. 1 are illustrated four of such fins, one of which is placed to be comparatively close to the ports B B' when the operating head is in its valve closing position, while the fin next adjacent the opposite side of said ports is shown as a little over 45° distant from the ports.

With this construction, it will be apparent that, when the head D is moved in a clockwise direction, one fin will move forwardly, immediately in front of the valve disks E, for the purpose of shifting any sediment immediately forward thereof from the path of said disks. If the valve is operated through 45°, the fin following the valve disks will be rotated from the position shown in Fig. 1 to a position wherein its forward edge will substantially register with the adjacent edges of the ports. Through this movement said latter fin will carry along with it any sediment which lies in its path of travel and bring the same at the close of such operation between the inlet and outlet ports of the valve, i. e., in the flow of the fluid passing through the valve. The pressure of the fluid will force this sediment through the outlet port B' thereby scavenging the valve chamber of said sediment.

During this operation the remaining fins shift the separate bodies of sediment with which they engage but this sediment is retained in the particular compartment in which it is initially deposited. In the normal operation of the valve, i. e., the opening and closing thereof, the sediment collected in one compartment, adjacent the valve disks, is expelled by the flow of fluid through the valve, but it will be apparent that the method of scavenging this particular compartment may be availed of for cleansing the remaining compartments, by simply imparting one complete revolution to the operating head, during which operation all of the compartments will be brought in succession, into communication with the direct flow of fluid through the casing, and will be scavenged in the manner described. That is to say, as the sediment in each compartment, in succession, is brought into the path of the flow of the fluid passing through the valve, it will be carried along with said fluid through the outlet port B'.

In imparting one complete revolution to the operating head D, in the construction shown, it will be necessary to remove the handle or wrench $c$ after rotating it through substantially 180°, and thereafter replace the handle on the valve post C before completing the remaining 180° rotation, because of the presence of the outlet nipple in the path of the complete rotation of the inlet. However, this necessity of changing the inlet may be readily obviated, in practice, by employing a slightly different form of operating means so positioned that projections on the valve will not interfere with a continuous cycle of the operations specified.

In the construction thus far described, the fins $d'$ are of such width as to be free from contact with the inner surfaces of the face-plates $a$ $a'$ but, if desired, these fins may be made wider so that such contact will be had. In this event, it will be manifest that the rotation of the operating head D will scrape the surface of the face-plates for the purpose of freeing the same of all sediment and, to subsequently deposit said sediment in the flow of fluid through the valve to bring about the scavenging operation hereinbefore described.

In the construction of Figs. 3 and 4, the valve casing is formed in the same manner as in the construction of Figs. 1 and 2, but the operating head F partakes of a slightly different form. In Fig. 4 the casing is shown in central section, while the operating head is shown in elevation. From these views it will appear that two of the four fins $f'$ are formed in substantially the same manner as the fins $d'$, i. e., they are free from engagement with the walls of the valve chamber, whereas the two remaining fins $f'$, next adjacent the sealing disks E, are made wider so as to engage with the inner surfaces of the face-plates and serve as scrapers. When the valve so constructed is operated, e. g., in a clock-wise direction, the scraper fin $f'$ preceding the valve disks in their travel will scrape the walls of the valve chamber free from sediment and serve to clear the path for said disks, while the scraper fin next succeeding the disks will scrape the material which has been deposited adjacent to the valve seat, into the direct flow of fluid through the valve chamber and cause the same to be carried off in said flow.

The construction of Figs. 5 and 6 is substantially the same as the construction of Figs. 3 and 4 except that, while in Figs. 3 and 4 the fins $f^2$ adjacent the sealing disks E, are made of sufficient width to engage with the opposite walls of the valve chamber, whereas in Figs. 5 and 6 said fins are somewhat narrower and means are associated therewith for carrying out the scraping operation. This means, in its preferred embodiment, consists in slotting the fins longitudinally, as at $f'$, and seating in the opposite sides of each slot an elongated scraper $g$. One or more springs $g'$ are interposed between each two scrapers for the purpose of normally forcing their outer edges against the walls of the valve chamber, as shown best in Fig. 6. The advantages of this construction over that of Figs. 3 and 4 are many. That is to say, a more even pressure and better scraping action may be accomplished by the spring pressed scrapers than could result from the construction of Figs. 3 and 4 unless, in said construction, the fins fit very tightly within the casing. This, of course, would render the head F somewhat hard to operate, as the fit would be a rigid one and not yielding, as when the springs are employed. Furthermore, it is usually unadvisable to make the rigid arms scrapers, as extremely exact machining is required for this operation, with the result that the cost of manufacture is increased over the spring construction. It will also appear that the wear on the construction of Fig. 6 will be taken up by the springs, whereas, in the construction of Fig. 4, no means is provided for taking up such wear.

In all of the foregoing constructions the fins are so associated with the operating head as to be operable therewith and divide the valve chamber into a plurality of compartments so that, when the head is operated the force applied therethrough is transmitted to the material in each compartment individually, and packing or jamming of a large body of this deposit is precluded. In any of the constructions, one complete revolution of the head will cause the contents of the individual compartments to be successively brought into the direct flow of fluid, and be carried off in said flow. While it is not essential that the scrapers be employed, it will be understood that they may be embodied in every fin of any construction. That is to say, each of the fins $d'$ of Fig. 1 may, if desired, be slotted, as described relative to the arcuate shape of the fins of Fig. 5, and straight scrapers, corresponding to the scraper $g$ associated with said fins $d'$, be mounted therein. Moreover, all of the fins of any one construction may be made wide, as are the arcuate fins $f'$ of Figs. 3 and 4, to serve as rigid scrapers. Other combinations of the various features of advantage hereinbefore described relative to the several structures, may be embodied in valve structure without departing from the spirit of this invention.

From the foregoing description, it will appear that any of the constructions described will operate with marked efficiency in controlling the flow of fluids. Whether these fluids contain a large percentage of solids in suspension, or whether they are practically pure, is immaterial since means is provided for handling precipitated solids and scavenging the valve chamber in a highly efficient and expeditious manner, without the necessity of dismantling the valve. Moreover, it is a decided advantage to mount the operating head for complete revolution within a coaxial chamber, even though fins or scrapers are not employed, as foreign material cannot tightly jam between the operating arm or head and the walls of the valve casing, with this coaxial construction.

It will be understood that, while the present invention has been described and illustrated in conjunction with a double sealing disk valve, it is equally well applicable for use in valves of the single disk type. Other modifications, within reasonable limits, may be made in adapting the invention to its various environments, and it is therefore to be understood that the showing herein made and described is for the purpose of illustration, only, and that the invention is as broadly novel as is commensurate with the appended claims.

Having thus fully described the invention, what I claim as new, and desire to secure by Letters Patent, is:

1. A non-clogging valve embodying a valve chamber of cylindrical form having walls in planes perpendicular to the axis of said cylinder, inlet and outlet ports communicating with said chamber, said ports being in a line parallel with the axis of the cylindrical chamber and located in the same radii between said axis and the periphery of the chamber, a head mounted co-axially of said chamber and adapted for rotation therein, diverging arms carried by said head for dividing the valve chamber into a plurality of compartments throughout which the sediment deposited in the valve chamber is distributed and means for actuating said head whereby the force applied through actuating means to the operating head is transmitted to said sediment at a plurality of points about the axis of rotation of said head and the jamming of the entire mass thereof between the head and the wall of the chamber is precluded.

2. A non-clogging valve embodying a cylindrical valve chamber, provided with alined inlet and outlet openings in the opposite ends thereof, a valve carrying and operating head rotatably mounted coaxially of said chamber, and adapted to be rotated to control the flow of liquid through the chamber, diverging arms carried by the head for dividing the valve chamber into a plurality of compartments throughout which the sediment deposited in the chamber is distributed, and means for rotating the head, whereby the force applied through the actuating means to the operating head is transmitted to said sediment at a plurality of points about the axis of rotation of the head and jamming of the entire mass between the head and the wall of the chamber is precluded.

3. A non-clogging valve embodying a valve chamber cylindrical in form with walls in planes perpendicular to the axis of said chamber, inlet and outlet ports communicating with said chamber, said ports being in a line parallel with the axis of the cylindrical chamber and located in the same radii thereof between the said axis and the periphery of the chamber, an operative valve head mounted co-axially to said chamber for complete rotation therein associated with means for sealing said ports, arms carried by said valve head and radiating from the center thereof and adapted to divide the valve chamber into a plurality of compartments within which the sediment deposited in the valve chamber is lodged and means for actuating the valve head whereby the force applied through the actuating means to the operating head is transmitted to said sediment at a plurality of points about the axis of rotation of said head and the jamming of the entire mass therein between the head and the walls of the chamber is precluded.

4. A non-clogging valve embodying a cylindrical valve chamber, provided with alined inlet and outlet ports in the opposite ends thereof, an operating head mounted for rotation within and coaxially of said chamber, port sealing means carried by said operating arm for controlling the flow of fluid through the chamber, and means for actuating the operating head, in combination with a plurality of partitions within the chamber and mounted for rotation with the operating head for dividing the valve chamber into a plurality of compartments throughout which the deposit of sediment in the chamber is distributed, whereby the force applied to actuate the operating head is transmitted to the sediment at a plurality of points and jamming of the entire mass thereof between the operating head and the wall of the chamber is precluded.

5. A non-clogging valve embodying a valve chamber cylindrical in form having walls in planes perpendicular to the axis of the chamber, inlet and outlet ports communicating therewith, said ports being in line parallel with the axis of the cylindrical chamber and in one radius thereof and located between said axis and the periphery of the chamber, a valve operating head mounted co-axially of the said chamber and adapted for complete rotation therein with means carried by the said valve head to close said ports, radial arms carried by said valve head adapted to rotate therewith and to divide said valve chamber into a plurality of radial chambers, means carried by said radial arms to scrape the walls of the said valve chamber and means for actuating the head whereby the force applied through the actuating means of the operative head is transmitted to the masses of sediment accumulated in each respective chamber formed between said radial arms and applied at a plurality of points about the axis of rotation of said head hence the jamming of the entire mass between the head and the walls of the chamber is precluded and the walls of the chamber are thereby scraped free of any deposit thereon and by said motion said sediment is conveyed into the path of the flow of the fluid through said inlet and outlet ports and by the fluid passing through the valve is conveyed out of the chamber so that in the complete rotation of the valve head the valve chamber is freed of any accumulation of sediment that may be therein.

6. A non-clogging valve embodying a cylindrical valve chamber, provided with alined inlet and outlet ports in the opposite ends thereof, an operating head mounted for rotation within and coaxially of said chamber, port sealing means carried by said operating head for controlling the flow of fluid through the chamber, and means for actuating the operating head, in combination with a plurality of partitions within the chamber and mounted for rotation with the operating head for dividing the valve chamber into a plurality of compartments throughout which the deposit of sediment in the chamber is distributed, whereby the force applied to actuate the operating head is transmitted to the sediment at a plurality of points and jamming of the entire mass thereof between the operating head and the wall of the chamber is precluded, at least one of said partitions being constituted to scrape the end walls of the chamber for the purpose of freeing sediment therefrom.

Signed by me at New York city, N. Y., this 28th day of March, 1917.

WYLIE GEMMEL WILSON.

Witnesses:
ANNA F. DAVIDSON,
MARGARET VOGEL.

Copies of this patent may be obtained for five cents each, by addressing the "Commissioner of Patents, Washington, D. C."